INVENTORS
Marshall W. Sawyer
Herman W. Wilson Jr.
Reginald G. Kenway
John S. Overholser

ATTORNEY.

July 5, 1955 M. W. SAWYER ET AL 2,712,210
MACHINE FOR CLOSING AND SEALING CELLOPHANE BAGS
Filed April 27, 1951 9 Sheets-Sheet 4

INVENTORS
Marshall W. Sawyer
Herman W. Wilson Jr.
Reginald G. Kenway
John S. Overholser

BY

ATTORNEY.

July 5, 1955 M. W. SAWYER ET AL 2,712,210
MACHINE FOR CLOSING AND SEALING CELLOPHANE BAGS
Filed April 27, 1951 9 Sheets-Sheet 6

INVENTORS
Marshall W. Sawyer
Herman W. Wilson Jr.
Reginald G. Kenway
John S. Overholser

BY

ATTORNEY.

INVENTORS
Marshall W. Sawyer
Herman W. Wilson Jr.
Reginald G. Kenway
John S. Overholser

BY

ATTORNEY.

United States Patent Office 2,712,210
Patented July 5, 1955

2,712,210

MACHINE FOR CLOSING AND SEALING CELLOPHANE BAGS

Marshall W. Sawyer, Los Angeles, Calif., Herman W. Wilson, Jr., Moscow, Idaho, and Reginald G. Kenway, Los Angeles, and John S. Overholser, Venice, Calif.; said Kenway and said Overholser assignors to said Sawyer and said Wilson, Jr.

Application April 27, 1951, Serial No. 223,178

24 Claims. (Cl. 53—26)

Our invention relates to means for automatically filling, closing and sealing bags, and relates especially to a device for closing and sealing bags which are filled with food products. The present device is used in conjunction with an automatic bag filling device which operates in timed relation to the bag closing and sealing device shown in the present application.

It is an object of the present invention to provide a device for closing and sealing filled bags, especially suited for use with bags made of materials of the character of cellophane and plastics. It may be here explained, that the term "filled" does not mean that the bag is filled to the level of the lip defining the mouth of the bag, but means that the bag is filled to a level which will leave sufficient material to be folded in, closed and sealed, thereby providing a closure for the formerly open mouth of the bag.

It is an object of the invention to provide an automatic device which will at relatively high speed close and seal filled bags of the character described herein, this device having means to receive a filled bag, fold in the mouth forming wall of the bag and then wind this mouth forming wall of the bag so as to form a roll to effectively close the bag, the device having means for securing this roll so that it cannot be unwound, without the securing means being rendered ineffective.

A further object of the invention is to provide a bag closing and sealing device having a novel means for rolling the mouth wall portion of the bag inwardly from the extremity of the wall toward the filled portion of the bag, the device having means for flattening the roll so that it has the appearance of being several consecutive folds.

A further object of the invention is to provide a device of this character having means for gluing or cementing the flattened roll which closes the mouth of the bag, against the top of the bag.

A further object of the invention is to provide in this device a novel rolling means which has controls for the operation of its rolling fingers enabling relatively high speed operation.

A further object of the invention is to provide a device of this character having means for adjusting the roll so that it may be readily removed from the rolling means employed to form it, thereby contributing to the effect of continuous operation of the device by avoiding interruptions in operation resulting from a roll resisting removal from the rolling means.

A further object of the invention is to provide a device having a conveyor for carrying bags away from the rolling means at the completion of the rolling operation, this conveyor means including means for holding the roll on each bag in position while the cementitious sealing substance has set or sufficiently hardened.

A further object of the invention is to provide means for adjusting the bag closing and sealing device for operation on bags of different capacities.

It is a further object of the invention to provide for relatively quick replacement of the rolling fingers, so that need for replacement of fingers will not keep the bag filling machine out of service for any great length of time.

A further object of the invention is to provide means whereby the platforms of the turntable may be readily adjusted when it is necessary to change over from one bag size to another in the operation of the machine.

A further object is to provide means for rupturing a bag so that its contents may be discharged, in event that there is failure in the removal of a bag from one position to another and danger to the machine results.

A further object of the invention is to provide means operative to lift the bag supporting platforms at the time the bags are being removed therefrom.

Further objects and advantages of the invention will be brought out in the following part of the specification wherein we have described a preferred embodiment of the invention in such detail as to make the disclosure easily understandable, without limiting the scope of the invention set forth in the accompanying claims.

Referring to the drawings which are for illustrative purposes only.

Figure 1:
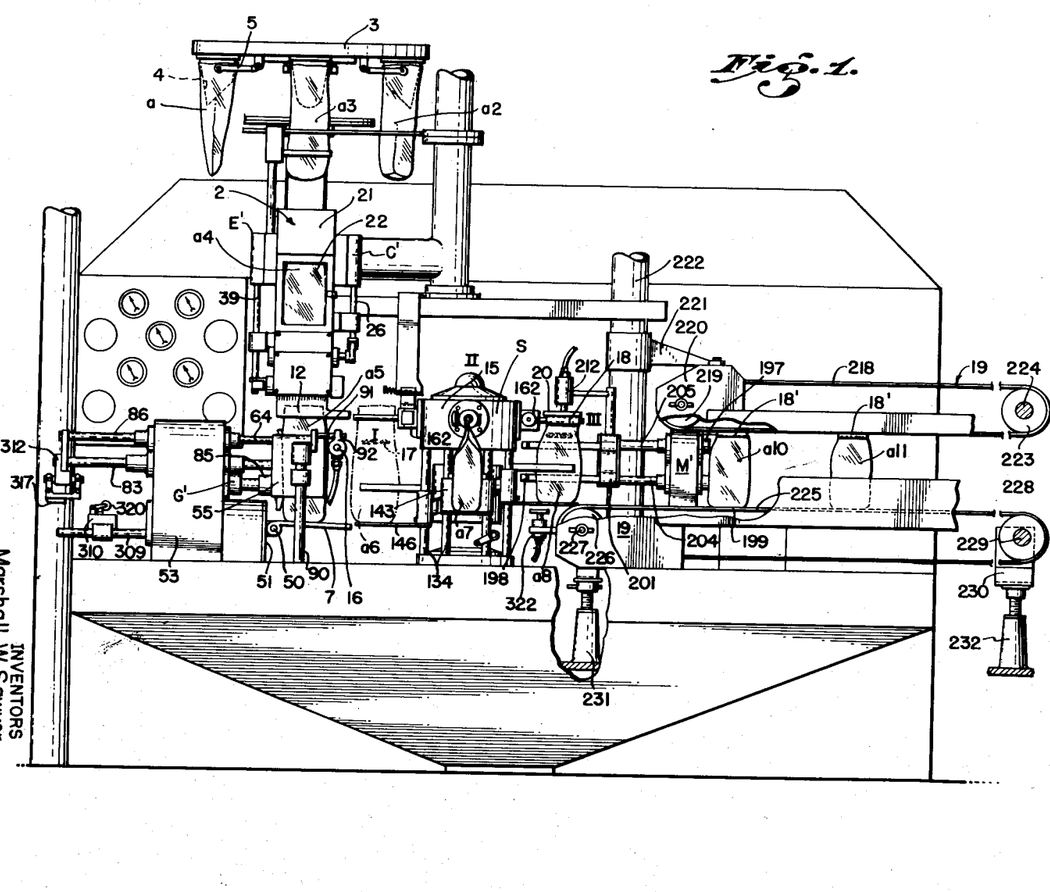
Fig. 1 is a simplified side elevation of a preferred form of the invention, this view showing bags in the process of being closed and sealed.

In the form of the invention disclosed in Fig. 1, we show means for delivering filled bags into a bag receiving chute and closing unit 2. In elevated relation to this unit 2, there is a turntable 3 which rotates on a vertical axis and is provided with a plurality of downwardly faced funnel members 4 over which the mouths of the bags to be filled are placed, and upon which the bags are secured by yokes 5 as described in detail in our copending application, Serial No. 270,968, filed February 11, 1952 for Machine for Opening and Filling Cellophane Bags.

A bag $a$ is placed on one of the funnels 4 and by movement of the turntable 3 is carried to the position of the bag $a2$ where it is filled through the funnel on which it is secured by a yoke 5. A further movement of the turntable 3 will carry the bag into the position of the filled bag $a3$ directly above the unit 2.

Figure 2:
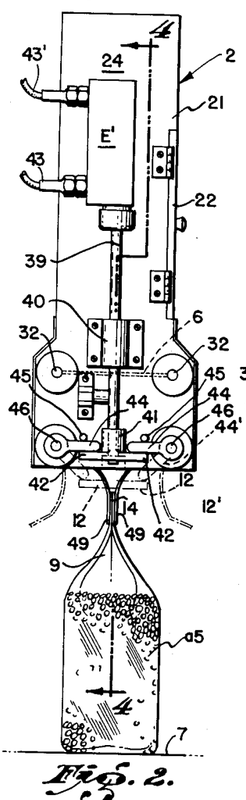
Fig. 2 is an enlarged view of the left hand face of the bag receiving and mouth closing unit of the machine as shown in Fig. 1, this view is showing a bag which has been discharged from the unit.
Figures 3, 4:
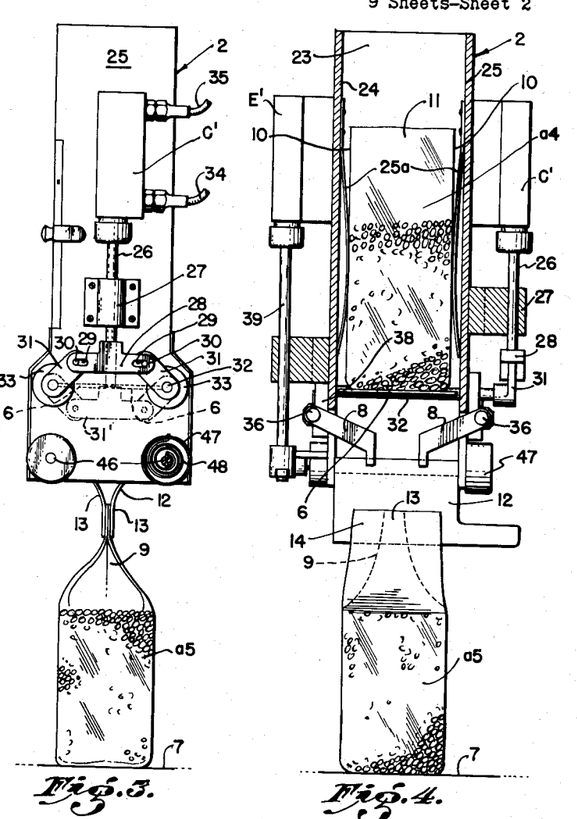
Fig. 3 is an enlarged elevational view of the right hand face of the unit and the discharged bag.
Fig. 4 is a sectional view taken as indicated at line 4—4 of Fig. 2, this view is showing a bag within the bag receiving unit and a bag which has been discharged from the unit.
Figure 5:
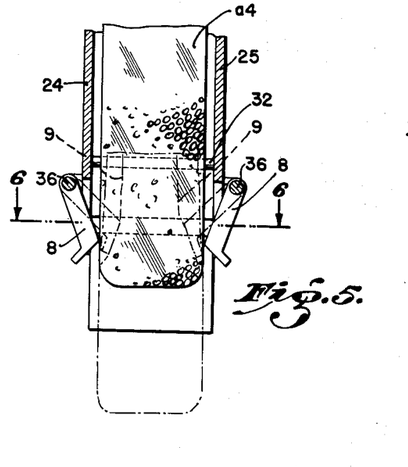
Fig. 5 is a fragmentary sectional view showing the manner in which the gusset folding elements of Fig. 4 operate to fold in the gussets of a bag as it moves in a direction to carry it out of the bag receiving and mouth closing unit.
Figure 6:
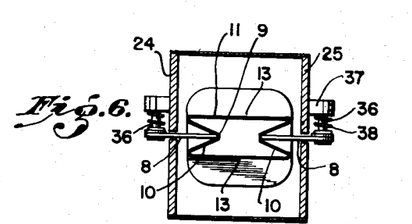
Fig. 6 is a cross-sectional view taken as indicated at line 6—6 of Fig. 5.

The bag is then dropped into unit 2 and there descends through the position of the bag $a4$, Figs. 1 and 4, where the contents of the bag are settled in the bag by reason of the bag bottom striking against transverse supports 6, Fig. 4, and by vibration applied to the bag and its contents if such is required by the type of product being packed. From the position of the bag $a4$, the filled and settled bag is dropped down to the position of the bag $a5$ on a second support or platform 7. As the bag moves down from the position of the bag $a4$ to the position of the bag $a5$, gusset folding fingers 8, as shown in Figs. 5 and 6, fold in gussets 9 in the opposite side portions 10 of the mouth forming wall portion 11 of the bag, and then as the bag reaches the position of the bag $a5$, mouth wall closing members 12 are swung inwardly from the positions thereof, approximately as shown in phantom lines 12' in Fig. 2, to the full line position in which they are shown in Figs. 2 and 3, to bring the portion 13 of the wall 11 between the gussets 9 together as shown in Figs. 1 to 4 and 6, thereby closing the mouth of the bag. The portion of the bag referred to as the mouth forming wall 11 is that portion of the wall of the bag which forms and lies adjacent to the opening of the bag through which the product is placed into the bag. For purpose of description the portion 14 of the bag wall lying between the members 12 in Figs. 2, 3 and 4, is referred to as the closed mouth or the closed mouth wall of the bag. This closed mouth 14 of the bag $a5$ is flat and extends from side to side across the top of the bag above its contents.

From the platform 7 the bag is shifted longitudinally to a mouth wall rolling means 15, as indicated by dotted line $a6$. As the bag is moved from the position $a5$ to the position $a6$, adhesive applying means 16 applies a stripe 17 of wet or tacky adhesive to the wall of the bag for sealing purposes, as will be hereinafter explained in detail. The bag indicated at $a6$ is then carried through the positions of the bags $a7$ and $a8$, during which time a roll 18 is formed on the closed mouth wall 14 of the bag. The bag, when it reaches the position of the bag $a8$, is shifted to a conveyor 19, so as to be carried through the positions of the bags $a9$ and $a10$, Fig. 21, and while the bag is being thus shifted a flattening and holding means 20 flattens the roll 18 against the top of the bag and brings a portion of the flattened roll into engagement with the adhesive stripe 17. The conveyor 19, as will be hereinafter described, has means for holding the flattened roll 18' against the top of the bag and in engagement with the adhesive for a time sufficient to permit the adhesive to set and hold the flattened roll 18' securely in this state, closing and effectively sealing the bag opening.

As shown in Figs. 1, 2 and 4, the bag receiving and closing unit 2 has a front wall 21, as shown in Fig. 4, equipped with a glazed door 22, a back wall 23 and side walls 24 and 25. Resiliently disposed bag-flattening members 25a are supported by the side walls 24 and 25 to minimize bulging of the sides of the bag in which the gussets are to be folded. These members 25a consist of leaf springs secured at their upper ends to the walls 24 and 25 and being formed so that they will press against opposite sides of the bag $a4$. On the side wall 25 there is a double acting fluid operated motor C' having a projecting rod 26 slidable through a guide 27 and having a laterally extending bracket 28 with slots 29 to receive pins 30, which project from levers 31. These levers 31 are mounted on parallel shafts 32 which extend across the interior of the receiving unit 22 from the wall 25 to the wall 24 and are turnably supported by bearings 33. The supports or settling doors 6 are secured to the shafts 32 so as to project radially therefrom. When fluid pressure is applied to the motor means C' through the conduit 34, Figs. 3 and 25, the levers 31 will be held in the elevated positions in which they are shown in Figs. 1, 3 and 4, and the supports 6 will be maintained in positions transversely of the receiving unit 2, as shown in Figs. 2, 3 and 4, to support a bag as indicated at $a4$. When the actuating fluid is fed into the motor means C' through the conduit 35, the rod 26 will be moved downwardly and the levers 31 will be swung to the lowered positions thereof indicated by phantom lines 31', Fig. 3, with the result that the supports 6 will be swung downwardly through angles of 90° to permit the bag $a4$ to drop to the position of the bag $a5$.

In the lower portion of the side walls 24 and 25 there are vertical slots through which the gusset folding or closing fingers 8 project from external supporting shafts 36 into the interior of the receiving unit 2 so as to lie along the path of downward movement of a filled bag from the position of the bag $a4$ to the position of the bag $a5$. As shown in Fig. 6, the shafts 36 are supported by brackets 37 mounted on walls 24 and 25 and coil springs 38, disposed around the shafts 36, act between the brackets 37 and the fingers 8 to urge the fingers 8 inwardly and upwardly in the general manner shown in Fig. 5 so that the inner portions of the fingers 8 will drag along opposite sides of the bag as it drops downwardly from the supports 6 to the supporting platform 7. Above the level of the contents of the bag these fingers 8 fold wall portions 10 of the bag wall 11 inwardly to form the gussets 9. The bags, as originally made, may have gussets folded in opposite sides thereof. If such is the case, the fingers 8 act to refold the upper portions of the original gussets inwardly above the level of the contents of the bag.

On the side wall 24 of the receiving unit 2, Fig. 2, a double acting fluid operated motor E' is mounted. This motor E' has a downwardly projecting rod 39 slidably supported by a guide 40. At the lower end of the rod 39 there is a lifting member 41 having oppositely projecting plates 42, arranged, upon raising of the rod as the result of applying fluid through the conduit 43 to the motor E' to lift levers 44 from the positions in which they are shown in phantom lines 44' to the full line positions thereof, against stops 45. The levers 44 are fixed on the shafts 46 which extend from the wall 24 to the wall 25 below the shafts 32, and on these shafts 46 the mouth wall closing members 12 are fixed. Around end portions of shaft 46, cylindrical housings 47 are supported by the wall 25, and coil springs 48 are disposed within these housings 47. One end of each spring 48 is connected to a shaft 46 and the other ends of the springs 48 are connected to the housings 47, the springs 48 being arranged and adjusted so that they will urge the shafts 46 in directions to swing the members 12 yieldably into the positions in which they are shown in full lines in Figs. 2 and 3. Therefore, as the lower end of the dropping bag engages the members 12, it swings these members downwardly from the full line positions thereof toward the positions in which they are shown in phantom lines 12' in Fig. 2. Then, as the downward movement of the bag continues, the members 12 wipe along opposite sides of the bag and follow the contour thereof with sufficient pressure to flatten the bag from its lower end upwardly to the upper level of the product in the bag, and as the upper level of the contents of the bag passes below the lower edges 49 of the members 12, these members 12 swing inwardly so as to bring the wall portions 13 together as shown in Figs. 2, 3 and 4.

The hydraulic mechanism shown has portions adapted to control the flow of fluid through the conduit 43 into the lower end of the motor E' to bring the plates 42, Fig. 2, upward and move or hold the levers 44 against the pins 45, thereby assuring centralization of the lower parts 49 of the members 12, on opposite sides of the closed mouth wall 14 of the bag. The stop pins 45, by limiting movement of the levers 44, limit movement of the members 12 so that the lower portions thereof will not tightly grip the closed mouth wall 14 but will engage the closed mouth wall 14 in such a manner that it may be slid from between the parts 49 as the bag a5 is moved to the position of the bag a6.

Figure 7:
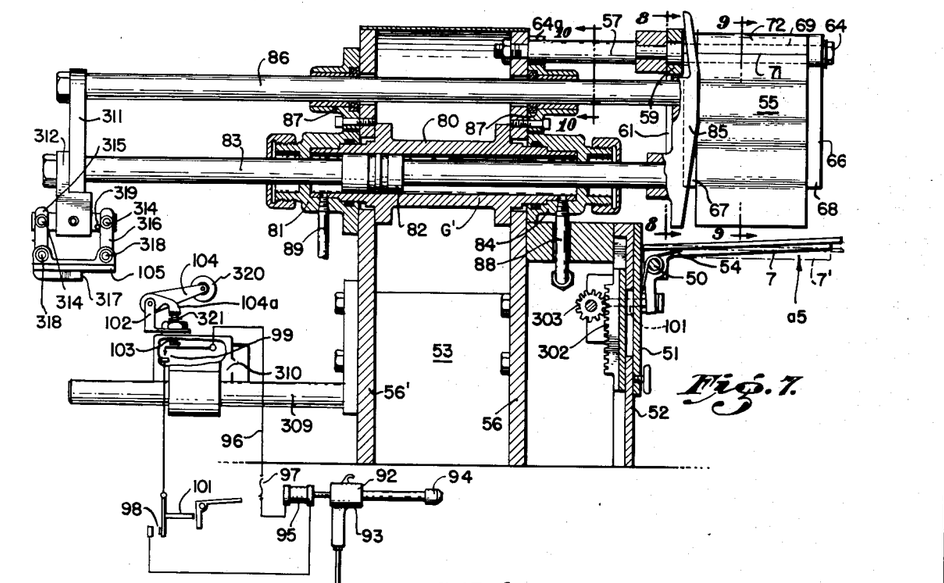
Fig. 7 is an enlarged partly sectional view showing the platform which receives the bag from the bag receiving and closing unit, and parts which operate in conjunction thereto including a schematic view showing the adhesive applying gun and the means for automatically controlling the same.
Figure 10:
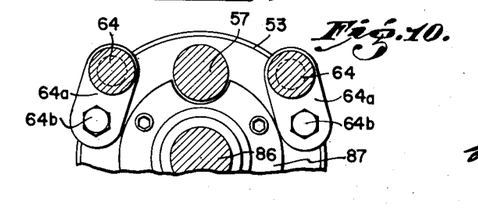
Fig. 10 is an enlarged sectional view taken as indicated by line 10—10 of Fig. 7.

As shown in Figs. 1 and 7, the platform 7 is mounted by means of a hinge 50 on a vertically adjustable plate 51, vertically slidable on the rightward vertical wall 52 of a housing 53. The platform is held by a spring 54 in the raised position in which it is shown in full lines in Fig. 7 when no bag rests thereupon, but when a filled bag is dropped down from the unit 2 into the position of the bag a5, Fig. 1, the weight of the bag and its contents will move the platform 7 downward into the position in which it is shown in Fig. 1 and in which it is shown in phantom lines 7' in Fig. 10.

Figure 8:
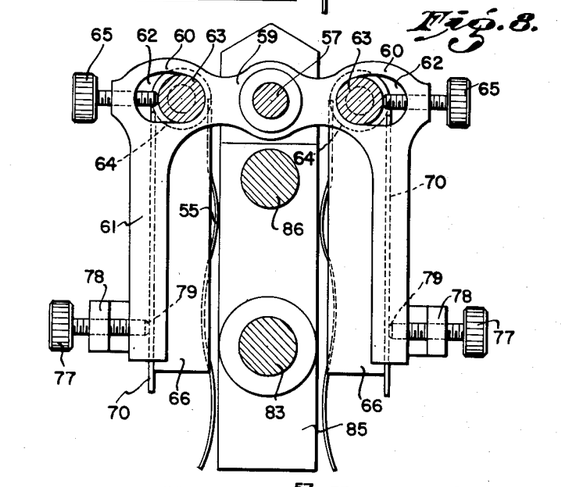
Fig. 8 is an enlarged sectional view taken as indicated at line 8—8 of Fig. 7.

When the filled bag drops onto the platform 7 it passes between and comes to rest between resiliently supported side plates 55 shown in spaced relation in Fig. 8, the purpose of which is to hold the engaged walls of the bag flattened. A face view of one of the plates 55 is shown in Fig. 7 and one of the plates 55 is shown in cross-section in Fig. 9. From a vertical wall 56 of the housing 53 an arm 57 extends toward the space immediately above the platform 7. At the forward end 58 of this arm 57 there is mounted a bracket 59 having laterally extending arms 60 and downwardly extending legs 61 at the other ends of the arms 60. Near the outer ends of the arms 60 there are openings 62 arranged to receive cylindrical enlargements 63 at the near ends of shaft elements 64, and thumb screws 65 are provided for engaging the enlargements 63 and adjusting the shaft elements 64 with relation to the center line defined by the axis of the arm 57. The inner ends of the shaft elements 64 are supported by links 64a, Fig. 10, which are swung on screws 64b threaded into the upper portion of the wall 56.

Figure 9:
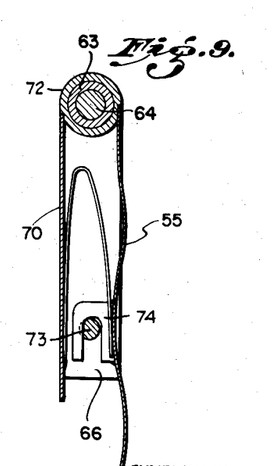
Fig. 9 is an enlarged sectional view taken as indicated at the line 9—9 of Fig. 7.

On each of the shaft elements 64 there is a plate holder 66 consisting of horizontally spaced flat bars 67 and 68, the upper ends of which have openings 69 through which a shaft element 64 extends. The bars 67 and 68 of each pair of bars are connected by a vertical plate 70 disposed in a plane parallel to the axis of the shaft element 64. As shown in Figs. 7 and 9, the upper edges 71 of the side plates 55 are attached to metal cylinders 72 which are turnable on the shaft elements 64 between bars 67 and 68 of the holders 66. The side plates 55 hang downwardly from the members 72 in space relation to the plates 70. Since the cylinders 72 are turnable on the shaft element 64, the lower portions of the plates 55 may swing relatively to the plates 70. The swinging movements of the plates 55 are limited by interengaging means between the plates 55 and the holder 66 consisting, as shown in Fig. 9, of the bar 73 carried by the bars 68 of the holder 56 and slotted members 74 carried by plates 55 so as to straddle the bars 73. Each holder 66 has a spring 75 arranged to engage the inner face of the associated plate 55 so as to urge the same a limited distance away from the adjacent plate 70 and toward the bag receiving space 76 indicated in Fig. 8. Means of adjustment are also included for the holder 66. Screws 77 threaded through locks 78 engage the lower portions of the holder 66 at 79 and may be screwed inwardly so as to force the lower portions of the holders 66 toward the bag receiving space 76.

The wall 56 of the housing 53 and a wall 56' of the housing 53 support a double-acting fluid motor G' comprising a horizontal cylinder 80 disposed on an axis above the plane defined by the platform 7, caps 81 and 84, to close the ends of the cylinder 80, a piston 82 slidable in the cylinder and a piston rod 83 projecting from the piston through the caps 81 and 84. On the rightward end of the rod 83 a pusher plate 85 is secured, and a guide rod 86 is extended leftwardly from the pusher plate 85 through guides 87 mounted in the walls 56 and 56' of the housing 53. When fluid pressure is delivered through a conduit 88 which is connected to rightward end of the cylinder 80, the piston 82 will be forced to the leftward end of the cylinder and the pusher plate 85 will be held in a position above the leftward portion of the platform 7, leftwardly of the bag a5, Fig. 1. When fluid pressure is applied through a conduit 89 to the leftward end of the cylinder 80 and pressure is released from the opposite end of the cylinder 80 through the conduit 88, the piston 82 will move rightwardly and move the pusher plate 85 rightwardly from the position in which it is shown in full lines in Figs. 1 and 7, so that the pusher plate 85 will engage the bag a5 and move it from its position on the platform 7 to the position of the bag a6 Fig. 1.

A bar 309 which projects leftwardly from the wall 56' supports a housing 310 which may be adjusted along the bar 309. In the housing 310 there is a switch 99. A pin 103 is supported by the housing 310 for operation of the switch 99, and a bracket 102 is provided which supports a lever means 104 in such position that when it is forced downwardly a portion 104a thereof will transmit downward movement to the pin 103 and close the switch 99.

The leftward ends of the rods 83 and 86 are tied together by a plate 311 and a body 312 is extended down from the end of the rod 83. A horizontal bar 313, fixed to the lower portion of the body 312, has pins 314 from which links 315 and 316 are hung. A cam member 317 is connected to the lower ends of the links 315 and 316 by pins 318. A stop 319 is carried by the bar 313 in a position to engage the link 316 when an attempt is made to rotate the link 316 in clockwise direction around the pin 314 by which it is supported. When the cam 317 is carried rightwardly by rightward movement of the rods 83 and 86 it will engage a roller 320 on the lever means 104 and swing the lever means 104 downward so as to move the pin 103 downwardly and hold the switch 99 closed during the engagement of the cam 317 with the roller 320. When the cam 317, moving rightwardly, passes the roller 320, a spring 321 will raise the lever means 104 and effect opening of the switch 99. When the cam 317 is returned to its leftward position, shown in Fig. 7, the leftward end of the cam 317 will engage the roller 320, but instead of the cam 317 forcing the roller 320 downward, a counterclockwise swinging of the levers 315 and 316 will result so that the cam 317 will ride upwardly and over the top of the roller 320, without forcing the lever means 104 downward. Accordingly, it is only during rightward movement of the piston 82 that the cam 317 will function to close the switch 99.

A standard 90, disposed in front of the platform 7, has at its upper end a rightwardly extending bar 91 on which is supported a spray gun 92 forming a part of the adhesive applying means 16. Since many types of spray guns are known, we have not shown the details of the spray gun 92. Such gun 92 is shown schematically in Fig. 7 as having a body 93 and a spray nozzle 94. A solenoid 95 is provided for opening the valve of the spray gun and is connected in a control circuit 96 having therein a source of electric current and two electrical switches 98 and 99 in series, both of which switches must be simultaneously closed during the time the solenoid 95 is to be energized so as to cause the gun 92 to issue a spray of adhesive. The switches 98 and 99, schematically shown, are of the snap off and snap on type. Switch 98 is mounted on the plate 51 in such relation to a lever 100 which projects downwardly from the leftward portion of the platform 7 as to be closed only when the platform 7 is depressed to the position 7' by the weight of a filled bag thereon. A stem 101 schematically indicates the operative connection between the platform 7' and the switch 98 whereby the switch 98 is opened by the raising of the platform when the bag is removed therefrom by rightward movement of the pusher 85, and is closed when a filled bag rests upon the platform 7. The switch 99 is disposed along the path of movement of one of the parts which is moved back and forth in the action of the hydraulic motor G'. Specifically, this switch 99 is positioned along the path of movement of the cam 317 and the arrangement is such that the switch 99 is open when the pusher plate 85 is in the retracted position in which it is shown in Figs. 1 and 7, is closed so as to actuate the spray gun 92 when the pusher member 85 is moved rightwardly so as to shift the rightward portion of the bag a5 into a position in front of the nozzle 94 of the spray gun 92, and is held closed by the cam 317 while the pusher continues to move the bag a5 rightwardly past the nozzle 94 of the spray gun 92 until the left portion of the bag a5 is aligned with the spray gun nozzle 94, at which time the switch 99 is again opened. Since the switch 98 is closed by the weight of a filled bag on the platform 7, the controlled closing of the switch 99 as above described will cause the adhesive applying means to actuate the spray gun so as to apply a stripe 17 of adhesive to the front face of the bag from side to side thereof slightly above the level of the product contained by the bag. The length of the cam 317 corresponds to the length of the stripe 17 of adhesive on the bag, and the position of the stripe 17 is determined by the position of the roller 320. The spray gun will not be actuated during the return or leftward movement of the pusher plate 85 for the reason that the switch 99 will not be closed as the result of leftward or reverse movement of the cam 317 and for the further reason that when the bag a5 is pushed off from the platform 7 onto the consecutive platform of the device, the platform 7 will be raised and the switch 98 will be opened, and this switch will remain open until another filled bag drops onto the platform 7 after the pusher plate 85 has reached its retracted position.

Figures 11, 19, 26:
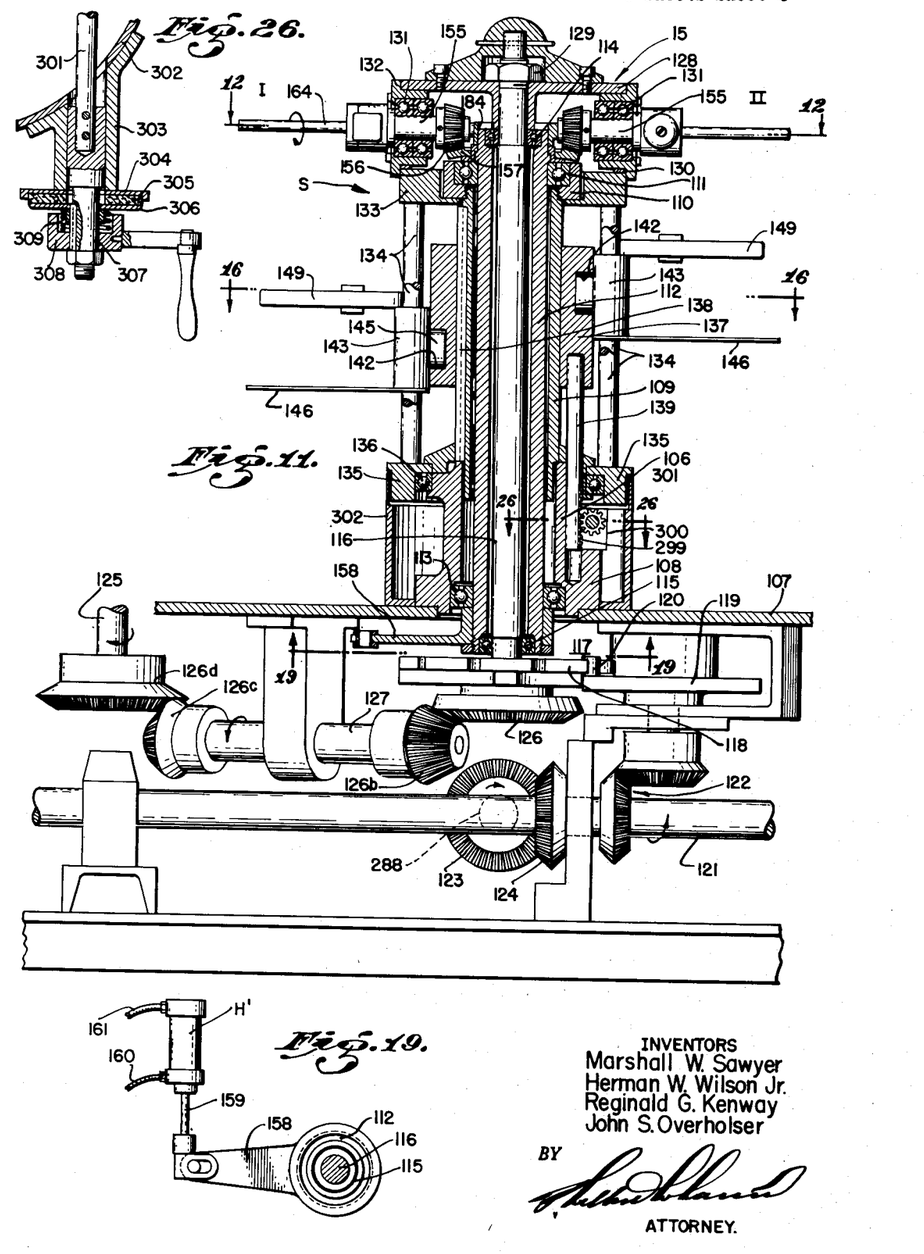
Fig. 11 is an enlarged partly sectional view showing the turntable which receives bags consecutively from the platform as shown in Fig. 7.
Fig. 19 is a fragmentary sectional view taken on the plane indicated by the line 19—19 of Fig. 11 and showing a part of the means for partly rotating the fingers of the mechanism shown therein.
Fig. 26 is a fragmentary sectional view taken as indicated by the line 26—26 of Fig. 11.

The rolling means 15 is shown in Figs. 11 to 18 inclusive. It includes, as shown in Fig. 11, stationary vertical tubular support 106 extending upwardly from the supporting plate 107. This tubular support 106 comprises a base portion 108 of generally cylindric form mounted directly upon the plate 107, a tube 109 extended upwardly from the base portion 108 and an annular bearing support 110 which is threaded upon the upper end of the tube 109. This bearing support 110 carries a radial bearing 111 to support the upper end of a sleeve 112 which extends axially through the support 106 and is supported at its lower end by a radial bearing 113 mounted in the lower part of the base portion 108. Radial bearings 114 and 115, disposed within the upper and lower ends of the sleeve 112, support a drive shaft 116 which is intermittently driven through consecutive angles of rotation of 90° by a locking type Geneva movement 117 comprising a notched driven plate 118 which is fixed on the downwardly projecting end of the shaft 116 and a driving plate 119 carrying pin means 120 for driving engagement with the plate 118. The driving plate 119 is driven in turn from a shaft 121 through a bevel gear set 122. A gear set consisting of gears 123 and 124 is employed to drive a shaft 288 which extends to the distributor valve 271, Fig. 23. The Geneva movement 117 also intermittently drives a vertical shaft 125 which is connected to the turntable 3 so that the same will be rotated in synchronism with the operative parts of the rolling means 15. This operative connection between the Geneva movement 117 and the shaft 125 is made through gears 126, 126b, 126c and 126d, the gears 126 and 126d being respectively fixed on the lower ends of the shafts 116 and 125 and the gears 126b and 126c being fixed on the ends of a transverse shaft 127, as shown in Fig. 11.

Figures 12, 13, 14, 15:
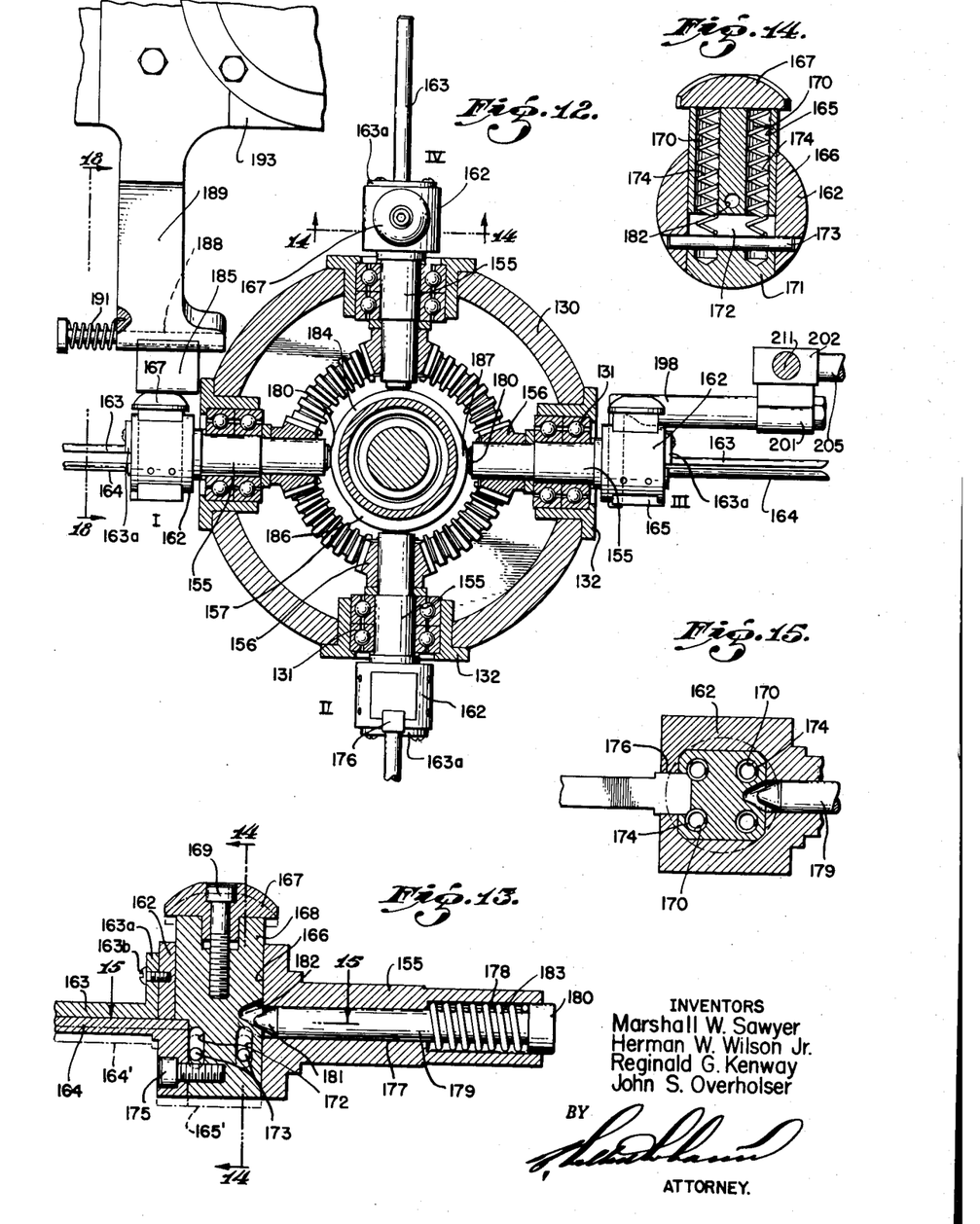
Fig. 12 is an enlarged fragmentary sectional view taken as indicated by the line 12—12 of Fig. 11, this view including portions of cooperating parts of adjacent mechanisms.
Fig. 13 is an enlarged longitudinal section of the rolling devices of Fig. 12.
Fig. 14 is a cross-section taken on the plane indicated by the line 14—14 of Fig. 13.
Fig. 15 is a fragmentary sectional view taken as indicated by the line 15—15 of Fig. 13.

The upper end of the shaft 116 carries a circular plate 128 which is clamped in place on the shaft 116 above the bearing 114 by a nut 129. A cylindric wall 130 extends downward from the peripheral portion of the plate 128 and supports four bearing sets 131, as shown in Figs. 11 and 12, on axis disposed radially of the shaft 116 and spaced apart at angles of 90°. The bearing sets 131 are carried by bearing cases 132 which are set into the wall 130. A ring 133 is secured to the lower end of the wall 130 in a position surrounding the lower portion of the annular bearing support 110 and four pairs of bars or vertical guide means 134 are extended downwardly externally of the tube 109. A ring 135 is fixed on the lower ends of the bars 134 in a position surrounding the upper portion of the base 106 and is supported for rotation by a radial bearing 136. The vertical guides 134 form parts of a rotatable structure actuated by the Geneva movement 117 through consecutive angles of rotation of 90° each.

Figures 16, 17, 18:
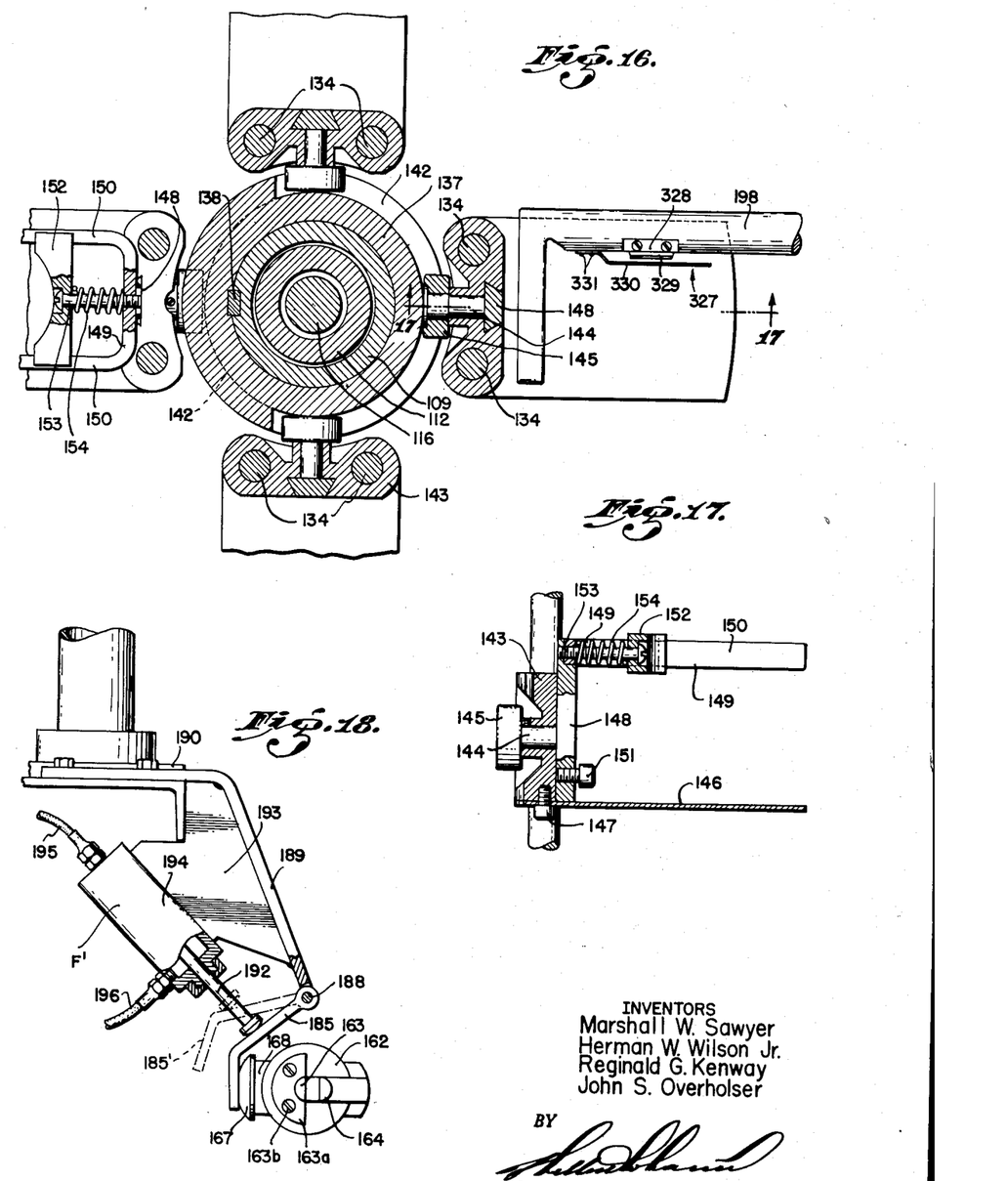
Fig. 16 is a fragmentary, enlarged cross-sectional view taken as indicated by the line 16—16 of Fig. 11.
Fig. 17 is a sectional view taken as indicated by the line 17—17 of Fig. 16.
Fig. 18 is a fragmentary, partly sectional elevational view on the parts lying to the right of the line 18—18 of Fig. 12, or showing the manner in which the rolling fingers are open so as to receive the closed mouth wall of a bag.

A cam 137 is mounted on the tube 109. This cam is a cylindric body and is guided for vertical sliding movement on the tube 109 by a bar 139. The cam 137 has a circumferential cam slot 142 which rises from a low position at the left-hand side of the cam to a high position on the right-hand side of the cam 137. On each pair of bars 134 there is a vertically movable body or carriage 143 having a projecting pin 144 which supports a roller 145 in the cam slot 142. Each carriage 143 has a platform plate 146 secured thereto by screws 147, as shown in Fig. 17, and each carriage 143 has a vertically adjustable bar 148 on the upper end of which there is a U-shaped metal member 149 providing laterally spaced guide or restraining fingers 150 above the platform 146 which projects from the same carriage 143. Each pair of restraining fingers 150 may be vertically adjusted by vertically moving the bar 148 with which they are associated, a set screw 151 being provided in each bar 148 for locking it in selected positions of adjustment. A cross bar 152 is mounted between each pair of fingers 150 and is adjustable along these fingers by a screw 153 and a spring 154 as shown in Figs. 16 and 17. The screw 153 is threaded through the transverse portion of the U-shaped member 149 and the upper portion of the bar 148, and the spring 154 is disposed around the screw 153 so as to act outwardly against the cross bar 152.

For vertical adjustment of the cam 137 a bar 139 is extended down from the cam 137 into a cavity formed in the body 106, there being a rack 299 on the lower end of the bar 139 adapted to be engaged by a gear 300 fixed on the inner end of a horizontal shaft 301 which, as shown in Fig. 26, extends out through a shell 302 which surrounds the body 106 and a portion of the ring 135. The forward portion of the shaft 301 extends through a fitting 303 having a flange 304 on its outer end. This flange 304 supports a disc 305 of frictional material which is engaged by a brake disc 306 which is splined on the projecting portion 307 of the shaft 301 so as to rotate therewith. A handle 308 is fixed on the projecting end 307 of the shaft 301 and a compression spring 309 is disposed between the hub of the handle 308 and the disc 306 to force the disc 306 tightly into engagement with the friction member 305 so that a braking effect will be provided which will resist rotation of the shaft 301. By use of the handle 308, working through the gear 300 and the rack 299, the cam 137 may be adjusted vertically to optimum position after which it may be locked by tightening a set screw 121 which is threaded through the lower portion of the cam 137.

Each bearing set 131 rotatably supports a spindle 155 which has a small bevel gear 156 fixed on its inner end so as to mesh with a companion bevel gear 157 which is fixed on the upper portion of the sleeve 112. The ratio of the pitch diameters of the gears 156 and 157 in the disclosed device is 1 to 3, and if the gear 157 is held stationary, rotation of the structure S will cause the gears 156 to roll upon the gear 157, thereby rotating the spindles 155 through an angle of 270° for each quarter revolution of the structure S resulting from a single rotation of the drive plate 119 of the Geneva movement 117. Rotation of the spindles 155 is also effected by a small angular rotation of the gear 157, this being accomplished by a small rotation of the sleeve 112 by motion imparted to a lever 158, Figs. 11 and 19, which is fixed on the lower end of the sleeve 112. A double acting fluid operated motor H', Figs. 19 and 25, has a piston rod 159 connected to the end of the lever 158. When fluid pressure is applied to the motor H' through the conduit 160, the lever 158 and the gear 157 will be held in positions in which they are shown in Figs. 11 and 12, and when fluid pressure is applied to the motor H' through the conduit 161, the lever 158 will be swung and the gear 157 rotated in clockwise direction, as viewed from above, causing the spindles to be rotated about 45° forwardly or in clockwise direction, when the spindles are viewed from the outer ends thereof.

As shown in Figs. 12–15, each spindle 155 includes at its outer end a body 162 adjacent to the cylindric wall 130. Each body 162 has a fixed finger 163 projecting therefrom along the radius of the spindle 155, and a cooperating movable finger 164 projects from a block or carriage 165 which is slidable in a transverse opening 166 in the associated body 162. Each fixed finger 163 is replaceable, and has at its inner end a plate or flange 163a adapted to be secured to the outer end of the body 162 by screws 163b. As shown in Figs. 13 and 14, the block 165 has a head or cap 167 secured to its front end 168 by a screw 169. This head 167 closes the outer ends of four openings 170, which are drilled inwardly in the block 165 from the front end face thereof, to points near the rear end 171 thereof. Two slots 172 are formed in the block 165 near the rear end 171 thereof, and each of these slots 172 intersects two of the drilled openings 170. Pins 173, in the body 162, extend across the opening 166 and through the slots 172 to limit the movement of the block 165 in the opening 166 of the body 162 and to serve as abutments or shoulders against which springs 174, in the openings 170, may react to constantly urge the block 165 forwardly into the position in which it is shown in the Figs. 13 and 14, in which position the fingers 163 and 164 are in closed relation, that is to say with the inner faces thereof actually or nearly touching. The finger 164 as shown in Fig. 13 is secured to the block 165 by a screw 175 and, as shown in Figs. 12 and 15, is slidable in a slot 176 in a body 162.

As shown in Figs. 13 and 15, each spindle 155 has an axial bore 177 communicating with the opening 166 of its body 162, and a counterbore 178 connecting the bore 177 with the inner end of the spindle 155. A pin 179, disposed in the bore 177 and the counterbore 178, has a head 180 which projects from the counterbore 178, and has a conical point 181 on its inner end arranged to enter a conical depression 182 in the adjacent face of the block 165. A spring 183 in the counterbore 178 acts against the head 180 to urge the pin 179 toward a circular cam 184, Figs. 11 and 12, which is secured on the upper end of the sleeve 112 in a position to be engaged by the heads 180 of the pins 179.

Two means are provided for opening or spreading the fingers 163 and 164 from the closed positions thereof, shown in Fig. 13. In position I, indicated in Fig. 12, finger 164 may be moved away from finger 163 by a lever 185 which is actuated so as to force the adjacent head 167 toward the body 162, thereby shifting the block 165 and the carried finger 164 into the positions in which they are shown in phantom lines 165' and 164' in Fig. 13 and in full lines in the left-hand side of Fig. 12 and in Fig. 18. As each spindle 155 approaches position II, Fig. 12, an enlargement on the cam 184, referred to as a crown 186 will urge the engaged head 180 outwardly, spreading the fingers 163 and 164 a distance of about 1/16 of an inch. Following the crown 186, the cam 184 recedes toward the rear end 187 thereof allowing the engaged head to drop back part way and permit the fingers to part way close by the time they reach position III, for example, to a separation of about 1/32 of an inch. As the spindles 155 pass from position III and through position IV, the fingers remain closed until they reach position I where they are again opened by the lever 185.

As shown in Figs. 12 and 18, the lever 185 is connected by a hinge pin 188 to a supporting bracket 189 which is secured to the supporting structure 190. The hinge pin 188 is in fixed relation to the lever 185 and is turnable relatively to the bracket 189. A spring 191 acts to rotate the pin 188 in the direction to hold the lever 185 against the projecting end of a piston rod 192 of a double acting fluid operated motor F' which is supported by a bracket extension 193, Fig. 18, from the bracket 189. When fluid pressure is applied to the cylinder 194 of the motor F' through a conduit 195, the piston rod will be extended and will force the lever 185 downwardly to the position in which it is shown in full lines in Figs. 12 and 18, pressing the head 167 inwardly relatively to the body 162 and moving the finger 164 in position I into open relation to the cooperating finger 163. When fluid pressure is delivered to the cylinder 194 through a conduit 196 the piston rod 192 will be retracted and the spring 191 will swing the lever 185 into the raised position in which it is shown in phantom lines 185' in Fig. 18, ready for a consecutive operation to open the next pair of fingers 163 and 164 subsequently to being brought into position I.

Figure 21:
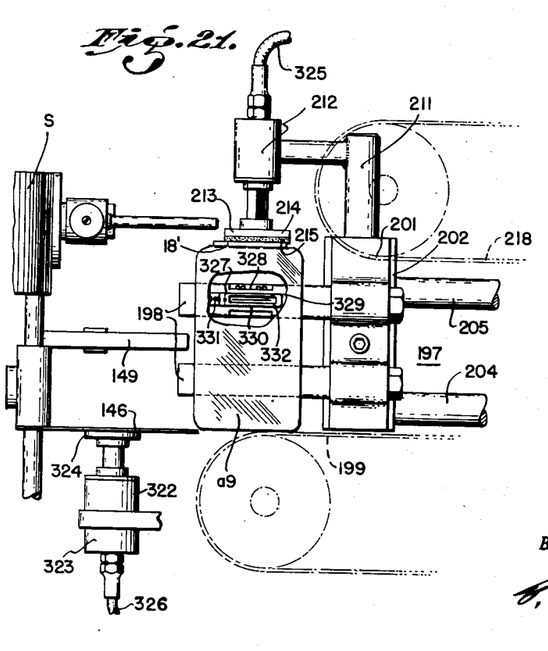
Fig. 21 is a fragmentary elevational view showing parts of the mechanism of Fig. 20 in a different position of adjustment.
Figure 22:
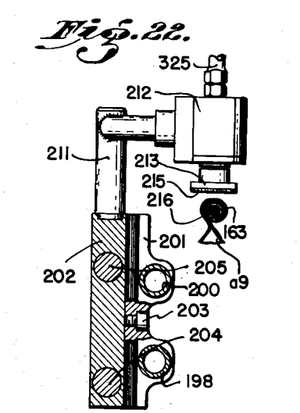
Fig. 22 is a sectional view taken substantially as indicated by the line 22—22 of Fig. 20.

The conveyor 19 is adjacent position III and between the structure S and the conveyor 19 there is a transfer or puller mechanism 197 having fingers 198, Figs. 1, 11 and 22, for shifting a bag from the position of the bag a8 unto the lower belt 199 of the conveyor 19, shown in Fig. 1. The fingers 198 are of L-shaped form and the end portions 200 thereof are attached in parallel relation to a plate 201 which is connected to a body 202 in vertically adjustable relation, a set screw 203 being provided for locking the parts 201 and 202 together in selected position of adjustment. The body 202 is connected to rods 204 and 205 which extend horizontally and in parallel relation through a structure 206 comprising a double-acting fluid operated motor M' and guides 206 for the rod 205. The motor M' comprises a cylinder 207 through which the rod 204 extends. A piston 208 on the rod 204 slides within the cylinder 207 between the limits defined by the packing members 209 disposed around the rod 204 at the ends of the cylinder 207. When fluid pressure is delivered into the cylinder 207 through a conduit 210, Fig. 20, the piston 208 will be moved to the leftward end of the cylinder and there hold, disposing the fingers 198 in overlapping relation to the position in which platform 146 resides in position III, a portion of the structure S being shown in Fig. 20 and also in Fig. 21, to show the relation of the puller mechanism 197 and the conveyor 19 to the bag-supporting parts of the structure S.

Figure 20:
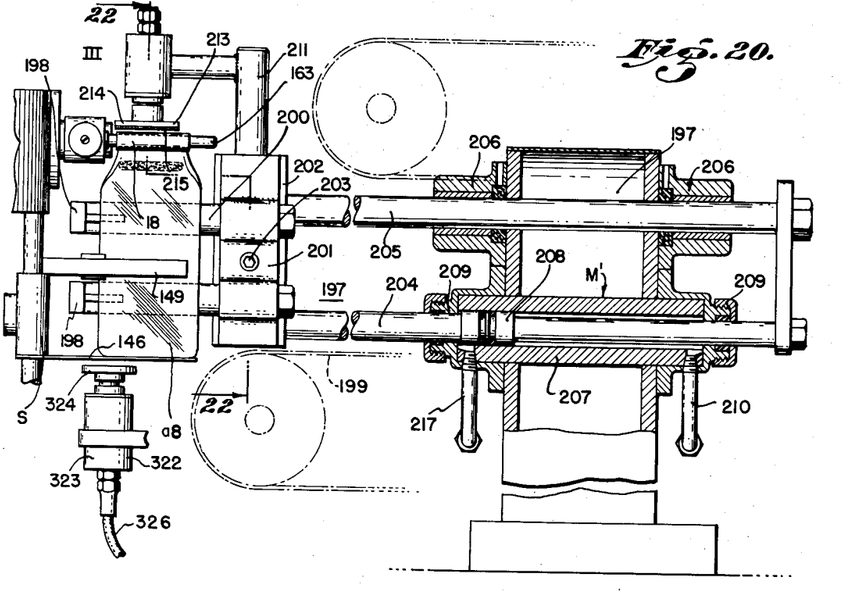
Fig. 20 is an enlarged partly sectional elevational view of means provided for flattening the rolls formed on the bag mouth wall, and for shifting the bags onto the conveyor mechanism of the machine.

A bracket 211, mounted on the body 202 supports a fluid actuated cylinder 212 arranged to move a flattener 213 downwardly from the position in which it is shown in Fig. 20 above the pair of fingers 163 and 164. The flattener 213 comprises a flat plate 214 and a wall of resilient rubbery material 215 secured to the lower face of the plate 214 for engagement with a roll 18 which the fingers 163 and 164 have formed on the top of the bag $a8$. To operate in conjunction with the flattener 213, a bag lifter 322 is provided. This bag lifter 322, as shown in Figs. 21 and 22, comprises a cylinder 323 adapted to lift a jack member 324 under the platform 146 in position III, thereby lifting the platform as shown in Fig. 21 at the same time the flattener is forced downwardly. The lifting of the platform 146 raises the entire bag $a8$ toward the fingers which support the roll 18, with the result that the roll 18 slides with greater ease off from the fingers 163 and 164 occupying position III. Flexible ducts 325 and 326 respectively connect the cylinders 212 and 323 with a valve 325a by which air pressure is delivered to the cylinders 212 and 323 slightly prior to starting of the rightward movement of the piston 208 and the puller fingers 198. The valve 325a is actuated by a cam 288a fixed on the shaft 288 which drives the valve device 271. This valve device is so timed with relation to the action of the valve 325 that shortly after actuation of the flattener 213 and the lifter 324 fluid pressure delivered to the cylinder 207 through a conduit 217 will move the piston 208 rightwardly from the position in which it is shown in Fig. 20 whereby the fingers 198 and the flattener 213 will be moved from the positions in Fig. 20 to the positions in which they are shown in Fig. 21, shifting the bag $a8$ from a platform 146 to the conveyor 19. The action of the flattener 213 is to flatten the roll 18 as indicated at 18' in Fig. 21. The conveyor 19 has an upper belt 218 spaced from the belt 199 at such distance that this belt 218 will engage the flattened roll 18' and the top of the bag, and hold the flattened roll 18', as shown in Fig. 1, against the adhesive stripe 17 previously applied to the bag. The bag is then moved along the conveyor 19 through the positions of the bags $a10$ and $a11$ in Fig. 1.

Should there be a failure in removal of the bag $a8$ from position III of the pedestal, as explained in the preceding paragraph, so that movement of the bag from position III toward position IV might result in injury either to the fingers which support the bag, the U-shaped member 149 or the extending parts 198, 204 and 205 of the puller mechanism 197, a bag slitter 327, Figs. 16 and 21, will act to rupture the bag $a8$ so that its contents will be discharged and injury to the mechanism prevented. The bag slitter comprises a knife support 328 secured to the upper bar 198 of the puller mechanism. This knife support carries a knife 329, consisting of a portion of a safety razor blade, in a position projecting forwardly toward the bag $a8$. A guard member 330, comprising a leaf spring, prevents inadvertent engagement of the bag $a8$ with the slitting knife 329. The resilient guard member 330 has one end 331 thereof secured to the knife support 328, and is provided with a slot 332 through which the knife 329 may project when the guard member 330 is deflexed by a bag which is being moved from position III toward position IV.

The conveyor 19, as shown diagrammatically in Fig. 1, has its upper belt 218 supported by means including a front pulley 219 carried by a pulley supporting frame member 220 which is attached by a bracket 221 to a post 222. The outer end of the belt 218 is supported, remote from the machine, by a pulley 223 supported on a shaft 224. The lower belt 225 of the conveyor 19 is supported so as to be vertically adjustable for accommodation of bags of different heights as will be hereinafter explained.

The forward end of the belt 225 is supported on a pulley 226 mounted on a shaft 227 which may be adjustably connected to the post 222. The outer end of the belt 225 is supported by a pulley 228 mounted on a shaft 229 which may be supported by brackets 230.

In order to provide for vertical adjustability of the lower belt 225, jack screws 231 and 232 are mounted on frame members beneath the forward and outer ends of the lower conveyor. As the jack screws 231 and 232 are operated, the lower conveyor may be moved upwardly or downwardly to accommodate different sizes of bags. The length of the conveyor is such that the glue, retaining the bag closure in place against the bag will have sufficient time to dry.

The belts 218 and 225 may be driven by any suitable means through the shafts 224 and 229.

Figures 23, 24, 25:
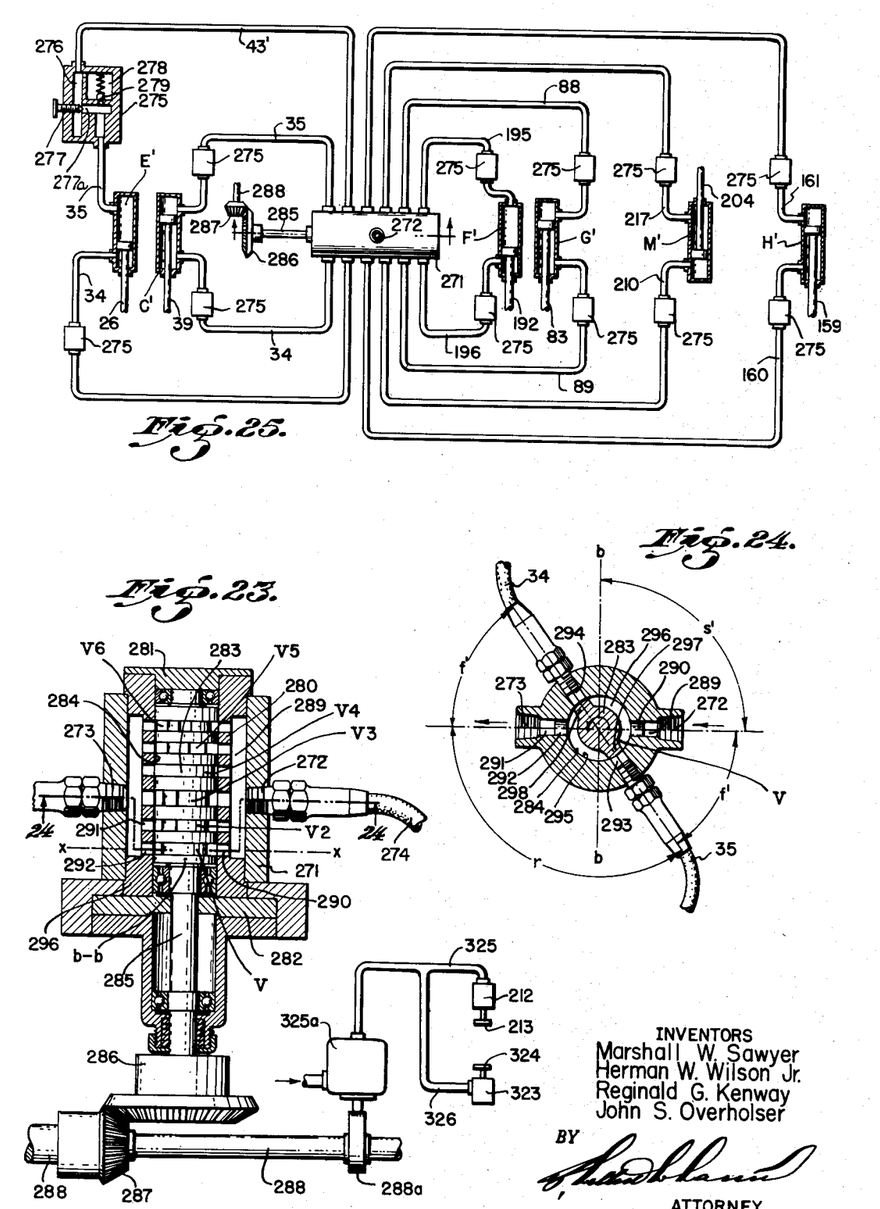
Fig. 23 is a fragmentary sectional view showing the hydraulic distributor valve forming part of the present invention.
Fig. 24 is a cross-sectional view taken as indicated by the line 24—24 of Fig. 23.
Fig. 25 is a schematic view showing an arrangement of hydraulic mechanisms usable in the chronological actuation of the parts of the machine.

As shown in Figs. 23 and 25, the fluid operated motors C', E', F', G', H' and M' are fed in properly timed relation by a distributor valve 271 having inlet and outlet openings 272 and 273 for hydraulic fluid which is received from a source, such as a pump and reservoir not shown, through conduit 274. Six pairs of conduits, as shown in Fig. 25, extend from the distributor valve 271 to serve six fluid operated motors. Each of the conduits leading to the hydraulic motors identified in the foregoing has therein a flow controlled device 275, details of which are shown in the upper left-hand corner of Fig. 25. The flow control device 275 has a valved passage 276 which is connected in series with the conduit which it serves, an adjustable valve closure 277 for controlling the rate of flow of the fluid from the distributor 271 through the valve port 277a to the fluid operated motor being actuated, a reverse flow passage or bypass 278 around the valve port 277a, and a check valve 279 for preventing a forward flow through the bypass 278.

The distributor 271 comprises a cylinder 280 closed by end walls 281 and 282, a valve body 283 rotatable in the bore 284 of the cylinder 280, and means for rotating the valve body 283 comprising a projecting shaft 285, a driven gear 286 fixed on the outer end of the shaft 285, and a driving gear 287 mounted on a shaft 288 which is connected to the shaft 121 of Fig. 11 so as to rotate at the same rate as the shaft 121. Therefore, one-half rotation of the valve body 283 occurs during one revolution of the Geneva driver 119. Connected with the inlet 272 so as to continuously receive hydraulic fluid under pressure, the cylinder 280 has an inlet manifold 289 connected by spaced inlet ports 290 with the bore 284 of the cylinder 280. On the opposite side of the cylinder 280 from the inlet manifold 289 there is an outlet manifold 291 which communicates through spaced outlet ports 292 with the bore 284. The outlet manifold 291 is connected to the fluid outlet 273. The distributor 271, as shown in Fig. 23, has six pairs of inlets and outlet ports 290 and 292 to correspond to the number of pairs of conduits shown in Fig. 25. In Fig. 24, the first two inlet and outlet ports 290 and 292 are shown, and also service ports 293 and 294 comprising drilled openings connected respectively to the ducts 34 and 35 which extend to the motor C'. The ports 290, 292, 293 and 294 all lie in the transverse plane x—x which is perpendicular to the axis of the valve body 283. In the plane x—x the valve body 283 has segmental body ducts 295 and 296 which consist of circumferential grooves, milled in the surface of the body 283, on opposite sides of a diametral plane of the body 283 and separated by closure lands or walls 297 and 298 which are left in the body 283 between the ends of the body ducts 295 and 296 in the milling thereof. These lands 297 and 298 are of a size to close the ports 290 and 292 when aligned therewith as shown in Fig. 24.

Rotation of the valve body 283 in clockwise direction from the position in which it is shown in Fig. 24 will cause the closure 297 to move downwardly away from the port 290 and the closure 298 to move upwardly away from the port 292, body duct 296 then connecting inlet port 290 with service port 294 and body duct 295 connecting outlet port 292 with service port 293. High pressure fluid will then flow through port 294 and duct 34 to the lower end of the motor C', Fig. 3, and piston rod 25 will be moved upwardly closing the settling doors 6. Continued clockwise rotation of the valve body 283 will cause the closures 297 and 298 to pass across the service ports 293 and 294 so that body duct 296 will connect ports 290 and 293 and body duct 295 will connect ports 292 and 294, permitting pressure fluid to now pass from the port 290 through the port 293 and duct 35 to the upper end of the motor C' and permitting the fluid from the upper end of the motor C' to pass through duct 34 and port 294 to the outlet port 292 as the piston rod 26, Figure 3, is lowered so as to again open the settling doors 6. When the valve body 283 has rotated through an angle of 180° the cycle of operation will have been finished. That is to say, the closure 297 will occupy the position in which the closure 298 is shown in Fig. 24, and closure 298 will be then in a position to close the port 290.

A feature of the distributor 271 is that the time of starting of the forward flow of fluid to a fluid operated device is determined by the position of the closures 297 and 298 with relation to an index point, line or plane defined on the valve body 283. In the present explanation, the index referred to is the plane b—b positioned so as to coincide with the axis of the body 283 and bearing a fixed relation to the body 283 so as to rotate therewith. In the illustration, Fig. 24, the angle s' between the index plane b—b and the plane on which the closures 297 and 298 lie is 90°; therefore, whenever, in the rotation of the body 283 the plane b—b passes through a position which is 90° from the plane c—c defined by the ports 290 and 292 of the valve cylinder 280, the flow of pressure fluid out through the port 294 and the duct 34 will start and this flow will continue until the closures 297 and 298 coincide with the ports 293 and 294. The length of time this flow outward through the port 294 continues is determined by the angular spacing of the ports 293 and 294 from the plane c—c defined by the ports 290 and 292, or, in other words, by the angle f' which is shown as being about 50°. Therefore, the time of the application of pressure through the port 294 will be about 5/18 of the time taken in the rotation of the valve body through an angle of revolution of 180° or one cycle of operation of the distributor 271. The complementary angle r indicates or determines the duration of the application of fluid pressure outward through the port 293 and the duct 35, and indicates the duration of the release of fluid pressure from the duct 34. The angle s' of the closures 297 and 298 from the index plane b—b determines the time at which a pressure differential operation of the fluid operated device starts, and the angle f' of the ports 293 and 294 from the plane c—c of the ports 290 and 292, determines the time at which the operation will be finished.

In the foregoing we have in detail described one valve section of the distributor 271. This valve section may be referred to as the section V. The distributor has in consecutive order sections V1, V2, V3, V4, V5 and V6, all including the same elements as described in the foregoing with relation to valve section V, except that in these additional sections, the closures 297 and 298 of the valve body 283 and the ports 293 and 294 of the cylinder 280 are positioned at angles s' and f' in accordance with the timing required for the operation of the fluid operated motors associated therewith.

Figure 27:
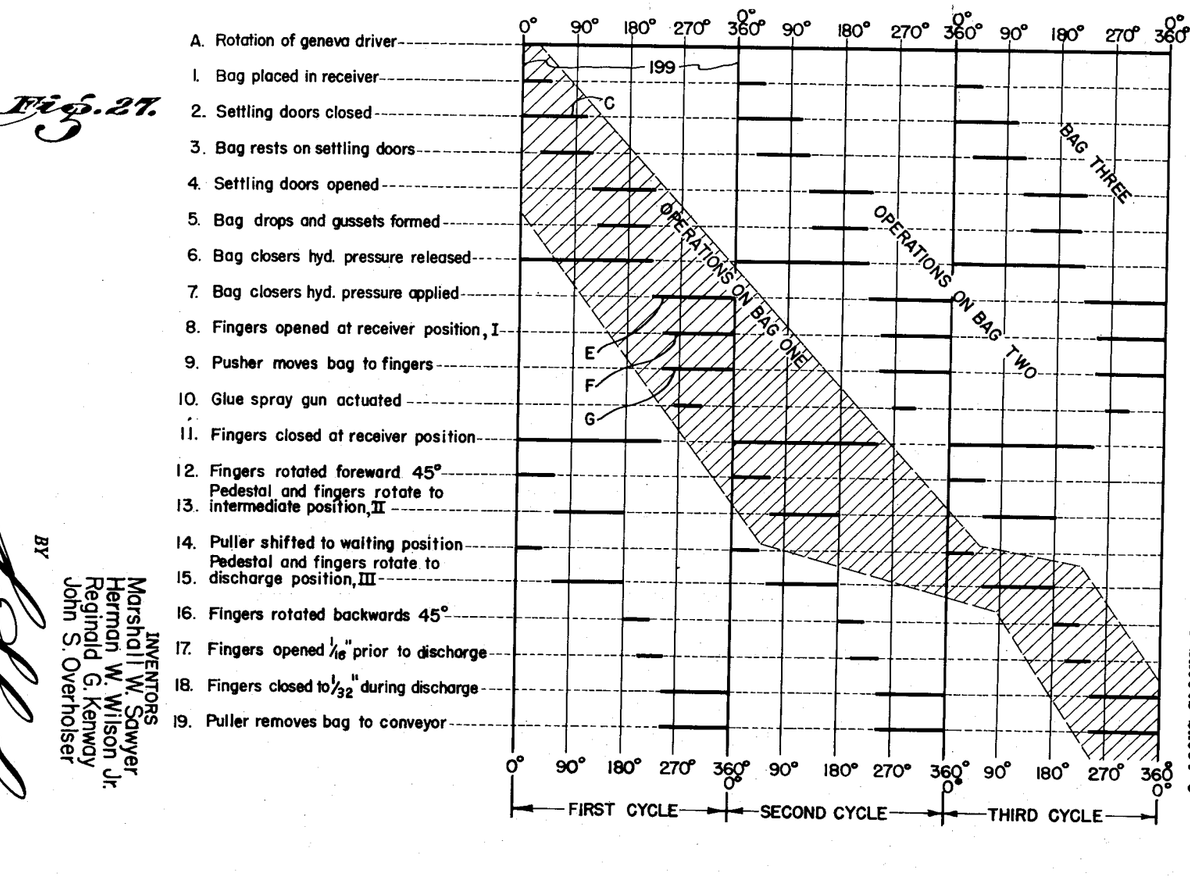
Fig. 27 is a chart showing the chronological operation of the mechanisms of the machine, and the sequential operation performed by the machine in closing and sealing a bag.

In Fig. 27 we present a chart showing the relationship of the operations of the cooperating parts of the device and the operations which are performed on a bag which is closed and sealed. All of these operations occur in timed relation to the rotation of the Geneva driver 119. In this chart, lines 199 indicate rotations of the Geneva driver 119 as identified in line A of the chart. As indicated in line 1 of the chart, a bag filled with product or substance, is placed in the receiver, and, as indicated in line 2, the placing of the bag in the receiver is at a time when the settling doors are closed. As indicated by graphic representation of the chart, this is at a time when section V of the distributor 271 is feeding hydraulic fluid through conduit 34 to the lower end of the fluid motor C', Fig. 3. As indicated in line 2 of the chart, the bag rests on the closed doors and by vibration of the doors the contents of the bag are caused to settle. Opening of the settling doors, occurring as indicated in line 4 of the chart, results in the dropping of the bag and the forming of gussets, as indicated in line 5 and as explained in the foregoing with relation to Figs. 4, 5, and 6. This dropping of the bag and forming of the gussets 9 occurs as shown in line 6 of the chart at a time when no hydraulic pressure is applied to lift the piston rod 39, Fig. 2, the bracket 41, and the levers of 44 by which the closing members 12 are brought together or actuated, but at this time the members 12 are urged inwardly only by the springs 48 as previously explained. At the point E of the chart, line 7, hydraulic pressure is applied through the duct 43, Fig. 2, and the closing members 12 are held in the positions in which they are shown in full lines by hydraulic pressure, the closed mouth wall 14 of the bag being then held in centralized relation to a pair of fingers 163—164 which are opened as indicated at F in line 8 of the chart, this opening of such fingers being accomplished by feeding fluid pressure through the conduit 195 into the upper end of the motor F', Fig. 18.

The bag at this time rests upon the platform 7, and as indicated at G in line 9 of the chart, the fluid operated motor G' is operated to move the bag from the platform 7 to the adjacent platform or shelf 146. The bag is moved from the position of the bag a5 in Fig. 1 to the position of the bag a6, the closed mouth wall 14 of the bag being shifted from between the closing members 12 into the narrow space or slot between the aligned fingers 163 and 164 residing in position I, Fig. 1, and during this time as indicated in line 10 of the chart, the spray gun 92 is actuated and the stripe 17 is applied to the bag. The bag now rests upon the platform 146 in the position of the bag a6, and as indicated in lines 11 and 12 in the chart, the fingers are closed and are rotated 45° in clockwise direction, when viewed from the outer ends thereof, as the result of the operation of the fluid operated motor H' to produce a partial rotation of the gear 157 as explained in the foregoing with relation to Fig. 19. As indicated in line 13 of the chart, the pedestal structure is rotated by the Geneva movement 117 from position I to position II. During this movement the gears 156 roll on the gear 157, rotating the fingers 163 and 164 because of the head 167 moving out of engagement with the lever 185, Fig. 18. The foregoing partially winds the closed mouth wall 14 of the bag into a roll 18. The last operation in the first cycle consisting of 360° of rotation of the Geneva driver 119 is that which is described in line 9 of Fig. 27. During the first part of the second cycle of the Geneva driver, as indicated at H and as described in lines 11 and 12 the fingers are closed and are rotated forwardly through an angle of 45°. Thereafter, during the first half of the second cycle of the Geneva driver shown in Fig. 27, the pedestal and fingers are rotated to the intermediate position II as described in line 13 of the chart. Directly above H in the first part of the second cycle of the chart, it will be perceived that bag No. 2 has been placed in the receiver and is resting upon the settling doors 6. Thereafter, between the time the bag is moved from position I to position II, line 13 of the chart, and then from position II to discharge position III, bag No. 2 will have passed through steps 1 to 12 and will be moved from position I to position II simultaneously with the movement of the bag No. 1 from position II to position III in the third cycle of the Geneva driver. However, as bag No. 1 moves from the position of the bag at a7 (II) to a point near the position of the bag a8 (III) the supporting fingers 163 and 164 are rotated reversely through an angle of 45°, step 16 of the chart, and the cam means 186 and 187 acts to spread the fingers 163 and 164 so as to enlarge the roll 18 and to then move the fingers closer together so that the roll 18 will not bear tightly upon the fingers, this opening and partial closing of the fingers occurring as indicated in lines 17 and 18 of the chart. As the bag reaches the position III, the fingers will be rotated 45° in reverse direction, thereby slightly unrolling the roll 18 so that it will be loosely disposed upon the fingers and will slide off from the fingers when the puller mechanism is actuated to remove the bag from a platform 146 and shift the same unto the conveyor 19, as indicated in line 19 of the chart.

As the pedestal structure rotates from position I to position III and the fingers rotate so as to form a roll 18 on a bag, the platform 146 on which the bag rests is moved upward to continuously support the bag and to prevent the bag from being suspended by the roll 18. Bags of different vertical length and therefore of different capacity may be closed and sealed in this machine. All of the platforms 7 and 146, the bag lifter 322, and the lower belt 199 of the conveyor are for this purpose made vertically adjustable.

We claim:

1. In a bag closing and sealing machine: a bag receiver to receive a filled bag; a closing mechanism operative to bring opposite portions of the mouth defining wall of the bag together so as to form a closed mouth wall; rolling means adapted to roll said closed mouth wall inwardly from the edge thereof toward the filled portion of the bag so as to form a mouth closing roll; and means for applying adhesive to hold said roll, said last named means comprising a control element actuated by a bag positioned in adhesive-receiving position to enable application of adhesive to the bag, said control element normally preventing operation of said adhesive applying means.

2. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; and overriding control means operating under control of said part in the first position thereof to enable operation of said means to apply adhesive.

3. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; and means operative to rotate said rolling members.

4. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; means adapted to close said rolling members against said closed mouth wall; means operating to revolve said rolling members so as to form a roll on the bag; means arranged to move said rolling members to a discharging position; means operating to open said rolling members; and means operating in said discharging position to move said roll off from said rolling members.

5. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; means adapted to close said rolling members against said closed mouth wall; means operating to revolve said rolling members so as to form a roll on the bag; means arranged to move said rolling members to a discharging position; means operating to open said rolling members; means operating in said discharging position to move said roll off from said rolling members; and a flattener acting to flatten said roll.

6. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; means adapted to close said rolling members against said closed mouth wall; means operating to revolve said rolling members so as to form a roll on the bag; means arranged to move said rolling members to a discharging position; means operating to open said rolling members; a conveyor located at said discharge position; means operating to move said bag from said rolling members to said conveyor; and means for flattening said roll of said bag.

7. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; means adapted to close said rolling members against said closed mouth wall; means operating to revolve said rolling members so as to form a roll on the bag; means arranged to move said rolling members to a discharging position; means operating to open said rolling members; a conveyor located at said discharge position; means operating to move said bag from said rolling members to said conveyor; means for flattening said roll as it moves off from said rolling members; and means operating to hold said roll flattened while the bag is on said conveyor.

8. In a bag closing and sealing machine: a bag receiver arranged to receive a filled bag and define a path of movement for the bag; members movable relatively toward each other from opposite sides of said path of movement operating to fold in gussets adjacent the mouth of the bag; closing means movable relatively toward each other from opposite sides of said path of movement and bringing together the portions of said bag between said gussets to form for the bag a closed mouth wall; supporting means for the bag following said closing means, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing means to a position between the said rolling members; means adapted to close said rolling members against said closed mouth wall; means operating to revolve said rolling members so as to form a roll on the bag; means arranged to move said rolling members to a discharging position; means operating to open said rolling members; means operating in said discharging position to move said bag from said rolling members; means acting to flatten said roll against the end of the bag; and conveyor means receiving the bag, said conveyor means comprising a pair of spaced belt elements arranged to engage opposite ends of the bag, one of said belt elements holding said roll flattened.

9. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; and overriding control means operating under control of said part in the first position thereof to enable operation of said means to apply adhesive.

10. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing members to a position between the said rolling members; and means operative to rotate said rolling members.

11. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing members to a position between the said rolling members; means adapted to close said rolling members against said closed mouth wall; means operating to revolve said rolling members so as to form a roll on the bag; means arranged to move said rolling members to a discharging position; means operating to open said rolling members; and means operating in said discharging position to move said roll off from said rolling members.

12. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing members to a position between the said rolling members; means adapted to close said rolling members against said closed mouth wall; means operating to revolve said rolling members so as to form a roll on the bag; means arranged to move said rolling members to a discharging position; means operating to open said rolling members; a conveyor located at said discharge position; means operating to move said bag from said rolling members to said conveyor; means for flattening said roll as it moves off from said rolling members; and means operating to hold said roll flattened while the bag is on said conveyor.

13. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing members to a position between the said rolling members; means adapted to close said rolling members against said closed mouth wall; means operating to revolve said rolling members so as to form a roll on the bag; means arranged to move said rolling members to a discharging position; means operating to open said rolling members; means operating in said discharging position to move said bag from said rolling members; means acting to flatten said roll against the end of the bag; and conveyor means receiving the bag, said conveyor means comprising a pair of spaced belt elements arranged to engage opposite ends of the bag, one of said belt elements holding said roll flattened.

14. In a bag closing and sealing mechanism: means to receive a filled bag, said means comprising members to engage sides of the bag and a removable support on which the bag rests; a second support disposed below said removable support; means operable to remove said removable support so that the bag will drop down onto said second support; gusset forming members resiliently supported below said removable support and arranged to fold gussets in opposite portions of the mouth wall of the bag; bag closing members below said gusset forming members movable so as to bring together the portions of the bag wall between said gussets to form for the bag a closed mouth wall; means adapted to roll said closed mouth wall inwardly toward the filled portion of the bag; and means for securing the rolled portion of the closed mouth roll from unrolling.

15. In a bag closing and sealing mechanism: means to receive a filled bag, said means comprising members to engage sides of the bag and a removable support on which the bag rests; a second support disposed below said removable support; means operable to remove said removable support so that the bag will drop down onto said second support, said second support being arranged so as to have movement in response to the weight of the filled bag; means responding to movement of said second support to control operation of a part of the mechanism; gusset forming members resiliently supported below said removable support and arranged to fold gussets in opposite portions of the mouth wall of the bag; bag closing members below said gusset forming members movable so as to bring together the portions of the bag wall between said gussets to form for the bag a closed mouth wall; means adapted to roll said closed mouth wall inwardly toward the filled portion of the bag; and means for securing the rolled portion of the closed mouth roll from unrolling.

16. In a bag closing and sealing mechanism: means to receive a filled bag, said means comprising members to engage sides of the bag and a removable support on which the bag rests; a second support disposed below said removable support; means operable to remove said removable support so that the bag will drop down onto said second support, said second support being arranged so as to have movement in response to the weight of the filled bag; gusset forming members resiliently supported below said removable support and arranged to fold gussets in opposite portions of the mouth wall of the bag; bag closing members below said gusset forming members movable so as to bring together the portions of the bag wall between said gussets to form for the bag a closed mouth wall; means operating to move said bag away from said second support; and means, controlled by movement of said second support, adapted to apply adhesive to said bag for use in securing said closed mouth wall.

17. In a bag closing and sealing machine: means arranged to receive a filled bag, said means having relatively moving closing members arranged to bring together portions of the mouth forming wall of the bag and form for the bag a closed mouth wall; supporting means for the bag following said closing members, said supporting means comprising a movable part arranged to be moved by the bag from a first position to a second position; means operating to apply adhesive to the bag; overriding control means operating under control of said part in the first position thereof to enable operation of said means to apply adhesive; mouth wall rolling members disposed in side by side relation; means for moving the bag so that said closed mouth wall thereof will pass from said closing members to a position between the said rolling members; means adapted to close said rolling members against said closed mouth wall; means operating to revolve said rolling members so as to form a roll on the bag; means arranged to move said rolling members to a discharging position; means operating to revolve said rolling members in reverse direction so as to loosen said roll and facilitate removal of said roll from said rolling members; means operating to open said rolling members; and means operating in said discharging position to move said roll off from said rolling members.

18. In a bag closing and sealing device: a first support for supporting a bag having a closed mouth; a rotatable pedestal; bag mouth rolling means projecting from said pedestal in a position to receive the closed mouth of the bag; means operating to move said bag so that its closed mouth will be received by said rolling means; means operating to rotate said pedestal so that said rolling means will be moved to a discharging position; means operating to revolve said rolling means so that a roll will be formed on the mouth wall of the bag; a second support for the bag, said second support being disposed on said pedestal; and means operating to move said second support and said rolling means relative to each other as said rolling means forms said roll on the mouth of the bag.

19. In a bag closing and sealing device: a first support for supporting a bag having a closed mouth; a rotatable pedestal; bag mouth rolling means projecting from said pedestal in a position to receive the closed mouth of the bag; means operating to move said bag so that its closed mouth will be received by said rolling means; means operating to rotate said pedestal so that said rolling means will be moved to a discharging position; means operating to revolve said rolling means so that a roll will be formed on the mouth wall of the bag; a second support for the bag, said second support being disposed on said pedestal; means operating to move said second support and said rolling means relative to each other as said rolling means forms said roll on the mouth of the bag; a third support arranged adjacent said discharge position; means operating to move said bag from said second support to said third support; and adjustment means operative to vertically adjust said supports for accommodation of bags of different lengths.

20. In a bag closing and sealing machine: means arranged to receive a filled bag, said means having relatively moving closing members arranged to bring together portions of the mouth forming wall of the bag and form for the bag a closed mouth wall; supporting means for the bag following said closing members; a rotatable pedestal; bag mouth rolling means projecting from said pedestal in a position to receive the closed mouth of the bag; means operating to move said bag so that its closed mouth will be received by said rolling means; means operating to rotate said pedestal so that said rolling means will be moved to a discharging position; means operating to revolve said rolling means so that a roll will be formed on the mouth wall of the bag; means at said discharging position to move said bag so that said roll will be removed from said rolling means.

21. In a bag closing device for use in a bag closing and sealing machine: a support arranged to receive a bag having a closed mouth; a rotatable pedestal adjacent said support; bag mouth rolling means projecting radially from said pedestal comprising a body rotatable on an axis positioned radially of the axis of rotation of said pedestal and fingers projecting from said body to receive therebetween said closed mouth; means operative to move said bag toward said pedestal so that said mouth will pass between said fingers; means for rotating said pedestal so as to move said bag rolling means to a second position; and means for rotating said mouth rolling means so as to form a roll on said bag, comprising gear means disposed on the axis of said pedestal and a gear member fixed on said body of said bag rolling means in a position to engage said gear means and being arranged to roll thereon and revolve said fingers around the axis of said body as said pedestal moves toward said second position thereof.

22. A bag closing device according to claim 21 wherein said gear means is rotatable independently of said pedestal and having means for rotating said gear means.

23. A bag closing device as defined in claim 21 wherein said fingers are mounted on said body in a manner to be opened and closed, and having means for opening and closing said fingers in a timed relation to the rotation of said pedestal.

24. A bag closing device as defined in claim 21 wherein said fingers are mounted on said body in a manner to be opened and closed, and having means for respectively opening and closing said fingers before and after said bag mouth is moved so that it will pass between said fingers.

References Cited in the file of this patent

UNITED STATES PATENTS

| | | |
|---|---|---|
| 1,456,836 | Slezak | May 29, 1923 |
| 1,625,720 | Gangler | Apr. 19, 1927 |
| 1,640,316 | Gangler | Aug. 23, 1927 |
| 1,909,319 | Taylor | May 16, 1933 |
| 1,979,496 | Schilbach | Nov. 6, 1934 |
| 2,083,067 | James | June 8, 1937 |
| 2,490,697 | McBeth | Dec. 6, 1949 |
| 2,576,471 | Messmer et al. | Nov. 27, 1951 |

FOREIGN PATENTS

| | | |
|---|---|---|
| 122,651 | Great Britain | Apr. 3, 1919 |
| 201,559 | Great Britain | Apr. 10, 1924 |